3,097,017
EXTRACTION METHOD AND APPARATUS
Roscoe E. Turner, 1330 E. Belleview Ave., Englewood, Colo., and Harold J. Ludwig, 3364 W. Chenango, Littleton, Colo.
Filed Oct. 2, 1959, Ser. No. 844,141
5 Claims. (Cl. 302—58)

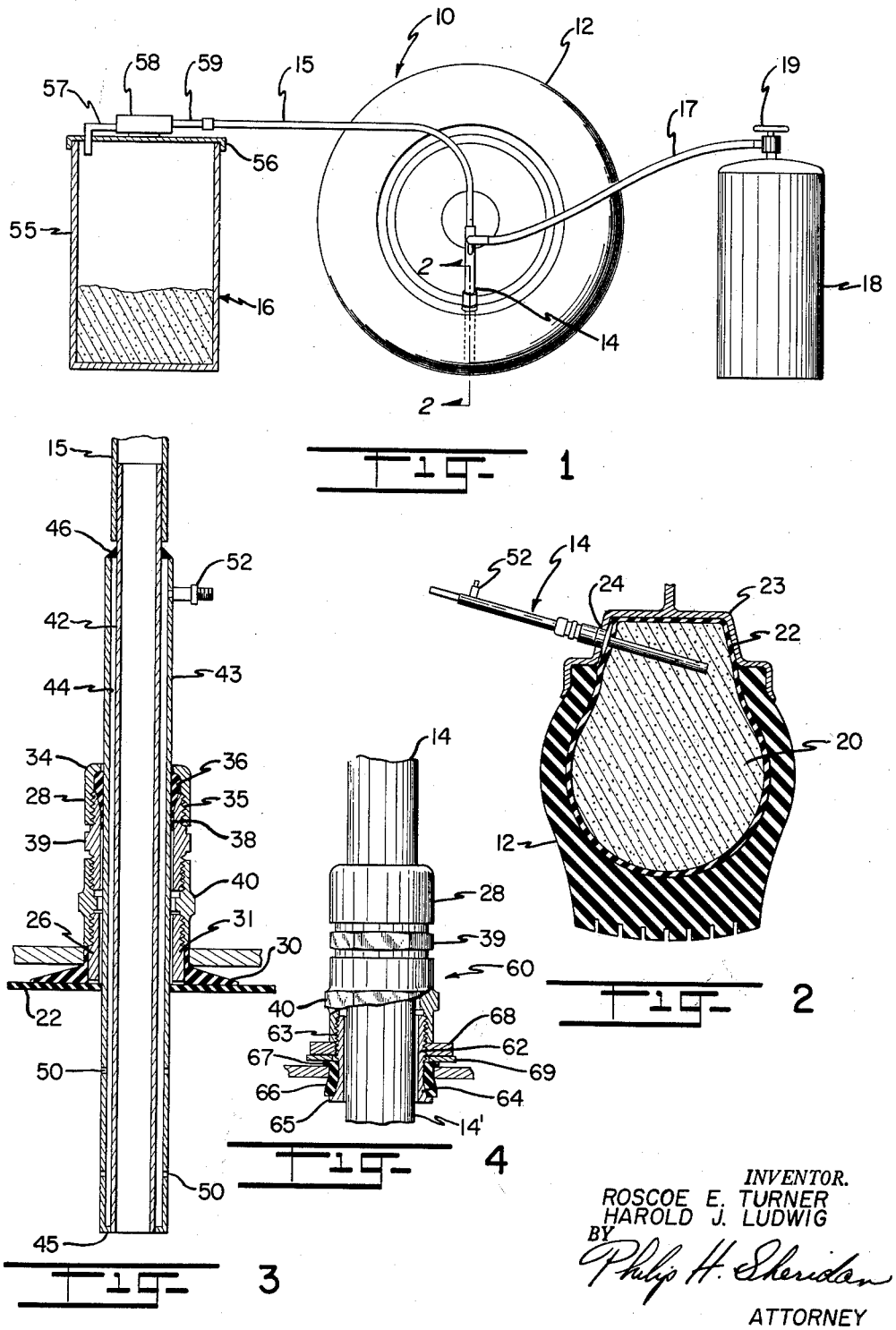
July 9, 1963    R. E. TURNER ETAL    3,097,017
EXTRACTION METHOD AND APPARATUS
Filed Oct. 2, 1959
INVENTOR.
ROSCOE E. TURNER
HAROLD J. LUDWIG
BY
*Philip H. Sheridan*
ATTORNEY United States Patent Office 3,097,017
Patented July 9, 1963

This invention relates to a method and apparatus for extracting fine granular material from an enclosed chamber, and has more particular relation to a novel and improved tool for effecting the withdrawal of such material from a chamber such as a vehicle tire in mounted position on a wheel, together with means for effectively sealing and positioning the tool for insertion through the valve opening in the wheel during the extraction operation.

It is customary to employ granular or powdery materials as ballast for the purpose of improving the riding qualities of a vehicle tire while at the same time making the tire puncture-proof and free from danger of blow-outs. The tire itself may either be of the tubeless or tube type and the material most desirably possesses a sufficient degree of fineness to be injected through the valve stem either on the wheel or on a specially designed valve stem in the tire to fill the tire to the desired extent. As desired, the injection of this material, commonly and hereinafter referred to as ballast, may or may not be accompanied by the injection of a selected amount of air under pressure.

Under normal riding conditions, the ballast material will assume a substantially semi-fluid condition so as to flow freely and easily within the tire and to effectively absorb impact and shocks imposed on the tire. However, when the tire is stationary the ballast exhibits a tendency to become very compact and tightly formed in the tire. Accordingly, in the event it becomes desirable and necessary to remove the ballast from the tire; for example, should the tire become punctured, it has been found very difficult employing normal extraction methods and tools to remove the ballast material, at least without first removing the tire from the wheel. Of course, it is highly desirable to accomplish extraction of the ballast without the necessity of removing the tire from the wheel so as to prevent loss of any of the ballast material and also to avoid considerable loss in time and labor. Moreover, where the ballast is contained in a tube type tire, in the event of rupture or severance of the stem on the tire to an extent making it impossible to replace the stem, especially under emergency conditions employing normal fast-curing methods, it has been found especially difficult to rapidly and efficiently remove all of the ballast from the tube without first removing the tube from the tire and employing a time-consuming manual operation to force the ballast out of the tube.

In accordance with the present invention, there has been devised a greatly simplified method and apparatus which is conformable for use in accomplishing the rapid and complete extraction of ballast from a tire, notwithstanding the type or condition of the tire. To carry out the extraction operation, there is further provided in accordance with the present invention a unique apparatus including a tool and connector to enable ease of attachment of the tool for extraction of the ballast from the tire, for example, under the conditions above stated where the stem has been severed from the tube. In addition to the above, the apparatus of the present invention is extremely portable and adaptable for use in the field under emergency conditions, as mentioned, to enable the most rapid and complete removal of the ballast prior to repair or replacement of the tire.

Accordingly, it is an object of the present invention to provide for an effective and reliable way of extracting ballast material from an enclosed chamber such as a vehicle tire.

It is another object to provide for a greatly simplified and improved means which obviates a number of past difficulties and disadvantages and which provides for the more effective and complete removal of the ballast from a vehicle tire, and more specifically, which accomplishes the above by effectively returning the material to a semi-fluid state for withdrawal from the tire without removal of the tire from the wheel.

It is a further object to provide in a ballast extraction apparatus a tool so constructed and arranged as to simultaneously agitate and induce the withdrawal of ballast material from a vehicle tire; and moreover, to provide for sealed attachment of the tool for extension through the valve opening either on the tire itself or the wheel rim in the event of severance of the valve stem. In the specification and claims of this application the term "tire member" means either inner tube or outer casing and the term "casing" has the same meaning as tire or the outer member of inner tube and tire combination.

The above and other objects and advantages of the present invention will become more apparent from the following detailed description taken together with the accompanying drawings, in which:

FIGURE 1 is an elevational view of a preferred form of extraction apparatus employed in the removal of ballast material from a vehicle tire;

FIGURE 2 is a view, partially in section, of the extraction tool of the present invention shown in attached relation with a tube type vehicle tire.

FIGURE 3 is a cross sectional view taken on line 2—2 of FIGURE 1; and

FIGURE 4 is a view partially in section of a preferred form of connector employed as a substitute for a valve stem to enable attachment of the tool of the present invention in sealed relation with a vehicle tube or tubeless type tire.

Referring more particularly to the drawings, there is shown by way of illustrative example in FIGURE 1 a preferred form of extractor 10 employed in conjunction with the removal of ballast from a vehicle tire 12, although it will become evident that the extractor of the present invention is conformable for use in the extraction of various types and sizes of granular and powdery materials stored in containers or chambers having limited access. Broadly, the extractor of the present invention is comprised of a tool 14 shown mounted for projection through the valve stem into the interior of the tire, a vacuum line 15 leading from the end of the tool to a container 16, along with an air line 17 leading from a source of compressed air 18 into the tool just forwardly of the connection of the vacuum line 15.

For purposes of illustration, and as shown more specifically in FIGURE 2, the tool 14 is shown mounted for removal of ballast material 20 which has previously been injected into the interior of a tube 22 of the tire 12. The tire 12 is shown mounted on a wheel rim 23, the latter being provided with a valve opening 24 in the usual manner through which normally projects a valve stem secured to the tube. Of course, the ballast material is most desirably employed in heavy duty tires, such as a tractor tire which under emergency conditions is very difficult to remove from the wheel rim without special tools and especially when filled with the ballast material. Accordingly, and as mentioned, it is highly desirable to accomplish the removal of, or extraction of, the ballast from the tire without necessitating the removal of the tire itself from the wheel and to this end, the tool of the present invention is so designed and constructed as to induce the withdrawal of the material from the tire essentially by the delivery of air into the tire in such a way as to aerate and loosen the material together with the simultaneous removal of the material, and preferably in the vicinity where the air is being delivered so that the material is free to move and in effect flow under semi-fluid conditions out of the tire.

The above is accomplished preferably by first inserting one end of the tool into the interior of the tire through a specially designed valve stem 26 to which may be secured a coupling 28 on the tool so as to provide for mounting of the tool in sealed relation to the stem and to the tube 22. It is to be understood that the stem 26 itself forms no part of the present invention and in accordance with well known practice, may be suitably comprised of a rubber-like annular shoulder portion 30 positioned at one end of a fitting 31 which is of a size to extend through the valve opening 24 and is threaded at its outer end for connection to the coupling 28. In order to first attach the stem 26 to the tube, it is first necessary to remove the standard valve stem from the tube, then through the use of commercially available rubber adhesives, the shoulder portion 30 may be rapidly cured to the inner tube 22 with the fitting portion 31 projecting outwardly through the valve opening. In turn, the coupling 28 may also be of any desired construction and for example may comprise a rearwardly disposed ring 34 being interiorly threaded as at 35 and having a gasket 36 positioned at the closed end of the ring for engagement by a tapered end portion 38 of sleeve 39 when the sleeve is brought into tight engagement with the ring 34. The opposed end of the sleeve 39 is also threaded to receive a coupling 40 which serves to interconnect the fitting 31 and sleeve 39. It will thus be evident that by threaded adjustment of the coupling 40 and sleeve 39 the tool may be securely connected into the stem 26 for extension in sealed relation into the interior of the tube 22.

In accordance with the present invention, the tool 14 is essentially defined by a pair of tubular members 42 and 43, respectively, which are most advantageously arranged in concentric relation to the end of providing the most compact construction and, more important, to permit insertion of the air delivery and ballast withdraw means at the same location. The outer concentric member 43 defining the ballast withdrawal means is of a diameter less than that of the fitting 31 for entry into the interior of the tube 22, and the inner concentric member defining the air delivery means 42 is of a diameter to form an annular space 44 between the tubes. The members 42 and 43 may be suitably connected in spaced relation such as by means of an annular partition 45 at the inserted end of the tool and weld 46 connecting the exterior end of the outer member 43 with an intermediate portion of the inner concentric tube 42. The tube 42 then extends rearwardly beyond the end of the outer member 43 for a length sufficient to permit connection of a flexible hose forming the vacuum line 15, in press fit relation or a clamp (not shown) may be employed. It will be further noted that the tube 42 is open throughout its length so as to provide and permit communication of the vacuum line 15 with the interior of the tube 22.

In order to provide for the delivery of air into the interior of the inner tube 22 in a manner to most effectively aerate and loosen the ballast material, the outer member 43 includes a series of openings 50 which are spaced along the length of the inserted portion of the tool. The air is directed through the annular space 44 and outwardly through the openings 50 from the air line 17 which is attached to an air valve 52 positioned at the rearward end of the tube 43. Of course, the air line 17 may be led into a source of compressed air 18, such as for example, the compressed air tank 18 including a valve 19 to regulate the pressure of the air injected into the tire.

The air supplied through the openings 50 in the tool performs a number of functions in removing the ballast from the tire. In the first place, since it is best to provide a sealed and secure connection between the tool and the tube 22, the injection of air into the tire serves essentially to maintain an increased pressure in the tire relative to the low pressure line 15 so as to encourage the movement of the material toward the open end of the tube 42. Secondly, the ballast, as mentioned, tends to become very compact and it is therefore very difficult to shift and cause it to flow without some means of agitation and accordingly, the air does loosen the ballast through the combined action of agitation caused by the jets of air together with aeration of the material by the air which operates to effectively swell and to puff up the ballast and convert it into a semi-fluid form. Thus, as the ballast becomes loosened through the injection of air into the tube, it will be free to flow toward the low pressure line defined by the tube 42 and hose member 15. As mentioned, by concentrically forming the tubular members of the tool, of course, the low pressure side will be located in the vicinity of the injection of air into the tube where the material becomes loosened and is free to flow around the end of the tool through the tube 42. In this connection, it will be evident that merely by creating a pressure differential between the interior of the tire and the low pressure line, this is sufficient in itself to encourage the movement of the material once it becomes loosened toward the tube 42. However, it is desirable to collect the material as it is being removed through the air pressure line such as by depositing it into the sealed container 16; thus, it maintain a reduced pressure, a vacuum unit 55 is employed together with the container to aid in withdrawing the material therethrough.

The collection unit 16 is accordingly comprised of a container 55 having a cover portion 56 attached in sealed relation to the container and in turn the cover or lid 56 is provided with a vacuum connection 57 leading into a vacuum unit 58 together with an intake 59 for connection of the low pressure line 15. Various commercially available vacuum units may be employed in carrying out the ballast extraction operation such as for example the types employed in standard vacuum cleaners so that the vacuum unit not only serves to improve the overall performance of the apparatus by encouraging the more rapid extraction of the material from the tire, but also cleans the material as it is being collected in the container 55. Of course, in the absence of a specially designed collection unit, the low pressure line 15 may be employed merely to direct the material from the tire at atmospheric pressure into any standard type of container although, of course, it will be apparent that the latter method of extraction may be somewhat slower.

In the event of rupture or severance of the normal valve stem attached to the inner tube 22, it will be evident that it is not possible to secure by normal curing methods a stem such as the stem 24 to the inner tube. In this event, and as best seen in FIGURE 4, there is provided in accordance with the present invention a unique connector 60 which establishes interconnection between the tool and the valve opening in the wheel rim to enable extension of the end of the tool through the valve opening into the interior of the tube in sealed relation. In general, it will be seen that no seal is established between the tool 14 and the inner tube 22, but only between the tool and wheel rim; however, through the injection of air into the tube and tire casing, the bead portions of the tire may be forced into sealed engagement with the wheel rim to provide a sealed chamber much in the same way as is accomplished in a tubeless tire. The connector 60 is essentially formed of a fitting 62 which is dimensioned to be slipped over the inserted end portion of the tool and having an outer diameter slightly less than the diameter of the opening so as to be adapted to move through the space formed between the surface of the tool and edge of the valve opening. Also, the fitting 62 includes an outer threaded end portion 63, and an inner enlarged end 64 including an outwardly directed shoulder portion 65 at the extremity thereof. Positioned on the inner end of the fitting is a rubber-like sleeve 66 having a shoulder portion 67 at its outer end and which is of a length to extend rearwardly from the shoulder in snug engagement between the edge of the valve opening and exterior surface of the inner end of the fitting. To establish interconnection between the tool and connector, a coupling 28 similar to that heretofore described and shown in FIGURE 3 may be employed, and as before, includes a union 40 which is interiorly threaded at either end to make connection between the sleeve portion 39 and threaded end 63. In addition, the connector is preferably provided with a nut 68 and washer 69 interposed between the end of the union 40 and outer surface of the wheel rim so that as the union is made up on the fitting, the nut 68 will tend to urge the enlarged end portion 64 and rubber-like sleeve 66 outwardly toward the valve opening until the sleeve will be forced into sealed engagement with the edge of the opening. It is to be noted that when the sleeve 66 is urged into engagement that the shoulder 65 serves effectively as a backing member to prevent the sleeve from stretching out as it is compressed and in this way to most effectively provide a seal between the fitting end valve opening. In the same manner as hereinbefore described, with the tool inserted through the valve opening the desired distance into the interior of the tire, the connector including the coupling may then be interconnected to rigidly position the tool. Afterwards, the extraction operation may be initiated for removal of the ballast from the tire.

It will be apparent from the above that the connector 60 is similarly adaptable for use with a standard tubeless tire and wheel rim combination to establish the desired interconnection between the tool and wheel rim. Accordingly, only two forms of connecting arrangements need be provided as accessories with the extraction apparatus of the present invention and these, of course, are conformable for use to suit the requirements of varying conditions in the field.

When conducting an extraction operation in accordance with the principles of the present invention, it will be seen that a minimum number of steps are required to accomplish the loosening and removal of the ballast material from the tire, namely, first injecting air into the tire, while simultaneously removing the ballast as it is loosened by maintaining a pressure differential between the interior of the tire and the ballast removal means. Preferably, this operation is carried out with the outlet provided for the removal of ballast being disposed in the vicinity of the injection of air, and with the injection of air being accomplished in such a way as to aerate and to agitate the ballast to convert it from immobile state to a loose semi-fluid condition so that it will readily flow toward the location of reduced pressure communicating with the interior of the tire. In this relation, although the apparatus, especially the tool as described, is thought to be most effective in carrying out this operation, it is apparent that other forms of apparatus would be effective to carry out the steps involved in the extraction of ballast. For example, the tubular members provided for the respective injection of air and removal of ballast need not be concentric member but may be mounted side by side for insertion through the opening, or if desired, may be inserted separately through separate locations provided in either the wheel rim or tire itself just so long as there is some means provided for injection of air into the tire together with conducting means maintained at a reduced pressure level relative to that existing in the tire to encourage the withdrawal of ballast material therethrough. Of course, where separate tubes are inserted into the tire at separate locations, it has been found that the extraction of the ballast is not nearly as effective, since the ballast removal line is stationed at a location remote from the point at which the ballast is being loosened. In addition, and as stated previously, it is not necessary to employ a vacuum unit although such is desirable from the standpoint of most effective overall performance along with providing some means to clean the ballast as its flows through the reduced pressure line 15 into the collecting tank.

It is, therefore, to be understood that various changes and modifications may be made in the construction of the apparatus together with the method of extraction employed without departing from the scope of the present invention, as defined by the appended claims.

What is claimed is:

1. Apparatus for removing ballast from an inner tube of a casing mounted on a wheel, comprising: a tool for insertion through an opening in said casing and an opening in said inner tube having two separate concentric channels for simultaneous application of pressure through one channel and reduced pressure through the other channel to the interior of said inner tube; a source of pressure connected to one of said channels; a source of reduced pressure connected to the other of said channels; a hollow connector into which said tool is fitted and adapted to connect said tool with the interior of the inner tube of said casing, comprising a hollow stem member for insertion through the opening in said casing having a base member at one end for attachment to the exterior surface of said inner tube over the opening therein; a coupling having one of its ends connected to the other end of said stem member; a fitting; a sleeve connecting said fitting and said coupling; and sealing means supported by said fitting for preventing leakage between said connector and said tool.

2. The apparatus of claim 1 in which the base member is adapted to be sealed to the exterior surface of the inner tube.

3. Apparatus for removing ballast from an inner tube of a casing mounted on a wheel, comprising: a tool for insertion through an opening in said casing and an opening in said inner tube to the interior of said inner tube for the introduction of pressure and reduced pressure therein, comprising: an interior tubular member; and an exterior tubular member mounted concentrically thereof to define a channel between said tubular members, said exterior tubular member having orifices in its wall at the end to be inserted in said inner tube, being sealed at both ends to said interior tubular member and provided with an inlet near its other end whereby a tool with two concentric channels are formed; a source of reduced pressure connected to said interior tubular member; a source of pressure connected to said inlet; a hollow connector into which said tool is fitted and adapted to connect said tool with the interior of said inner tube, comprising: a hollow stem member to be inserted through the opening in said casing having a base member at one end for attachment to the exterior surface of said inner tube over the opening therein; a hollow coupling having one of its ends connected to the other end of said stem member; and sealing means sealing said coupling to said tool.

4. The apparatus of claim 3 in which said base member is a vulcanizable material and is adapted to be sealed to the exterior surface of the inner tube by vulcanization.

5. Apparatus for removing ballast from a tire member mounted on a wheel, comprising: in combination, a tool for insertion through an opening in said tire member to the interior thereof for the introduction of pressure and reduced pressure therein, said tool comprised of an interior tubular member, and an exterior tubular member mounted concentrically thereof to define a channel between said tubular members, said exterior tubular member having orifices in its wall at the end for insertion in said tire member, being sealed at both ends to said interior tubular member, and provided with an inlet near said other end;

a source of reduced pressure connected to said interior tubular member; a source of pressure connected to said inlet; a hollow connector into which said tool is fitted and adapted to connect said tool with the interior of said tire member in an air tight manner, said connector being defined by a hollow stem member with one end adapted for insertion through the opening in said tire member and having a external annular shoulder on said one end; a hollow coupling attached to the other end of said stem member; sealing means providing a seal between said coupling and said tool; an annular expansible member having an annular boss at its top edge and being positioned over said stem member between the stem member and the periphery of said opening and with its lower edge abutting said shoulder and the lower surface of said boss abutting the upper surface of the rim of said opening; and means for applying downward pressure on the top of said expansible member to expand it against the periphery of said opening to form an air tight seal between the opening and stem member.

References Cited in the file of this patent

UNITED STATES PATENTS

| | | |
|---|---|---|
| 528,418 | Duckham | Oct. 30, 1894 |
| 546,953 | Davis | Sept. 24, 1895 |
| 840,469 | Berry | Jan. 8, 1907 |
| 850,410 | Weatherhead | Apr. 16, 1907 |
| 1,125,413 | Van Doren | Jan. 19, 1915 |
| 2,011,133 | Yoss | Aug. 13, 1935 |
| 2,222,047 | Snyder | Nov. 19, 1940 |
| 2,239,010 | McMillan | Apr. 22, 1941 |
| 2,311,901 | Palko | Feb. 23, 1943 |
| 2,339,381 | Crowley | Jan. 18, 1944 |
| 2,494,454 | Ritchie | Jan. 10, 1950 |
| 2,580,215 | Bozich | Dec. 25, 1951 |
| 2,581,914 | Darrow | Jan. 8, 1952 |
| 2,950,146 | Lease et al. | Aug. 23, 1960 |

FOREIGN PATENTS

| | | |
|---|---|---|
| 300,998 | Germany | Oct. 4, 1917 |